(12) United States Patent
Gaucher et al.

(10) Patent No.: US 11,027,703 B2
(45) Date of Patent: Jun. 8, 2021

(54) SUPPORT MOUNT FOR A WIPER BLADE, ASSOCIATED WIPER BLADE AND WIPING SYSTEM

(71) Applicant: Valeo Systèmes d'Essuyage, Le Mesnil Saint Denis (FR)

(72) Inventors: Vincent Gaucher, Le Mesnil Saint Denis (FR); Olivier Jomard, Issoire (FR); Stéphane Houssat, Issoire (FR); Eric Poton, Issoire (FR)

(73) Assignee: Valeo Systèmes d'Essuyage, Le Mesnil Saint Denis (FR)

( * ) Notice: Subject to any disclaimer, the term of this patent is extended or adjusted under 35 U.S.C. 154(b) by 264 days.

(21) Appl. No.: 16/339,275

(22) PCT Filed: Oct. 3, 2017

(86) PCT No.: PCT/EP2017/075087
§ 371 (c)(1),
(2) Date: Apr. 3, 2019

(87) PCT Pub. No.: WO2018/065421
PCT Pub. Date: Apr. 12, 2018

(65) Prior Publication Data
US 2020/0039473 A1 Feb. 6, 2020

(30) Foreign Application Priority Data

Oct. 4, 2016 (FR) ...................................... 1659544

(51) Int. Cl.
*B60S 1/38* (2006.01)
(52) U.S. Cl.
CPC ..... *B60S 1/3801* (2013.01); *B60S 2001/3812* (2013.01)

(58) Field of Classification Search
CPC ....................... B60S 1/3801; B60S 2001/3812
See application file for complete search history.

(56) References Cited

FOREIGN PATENT DOCUMENTS

DE 19861483 B4 6/2016
EP 2815935 A2 12/2014
(Continued)

OTHER PUBLICATIONS

International Search Report and Written Opinion in corresponding International Application No. PCT/EP2017/075087, dated Nov. 8, 2017 (10 pages).

*Primary Examiner* — Andrew A Horton
(74) *Attorney, Agent, or Firm* — Osha Bergman Watanabe & Burton LLP (57) ABSTRACT

The invention relates to a support mount (10) for a wiper blade, the mount (10) comprising a body having a main longitudinal extension direction, known as the main direction (X), the body comprising a first means for receiving a bending length and second means defining a lower housing (20), open, to hold an upper mounting stub for a wiper blade of the wiper, characterised in that the first means defines an upper housing (30) designed so as to cover the length along the main direction (X) and in that the upper housing (30) comprises a plurality of recesses (32, 32', 32") facilitating the bending of the mount (10), the recesses forming a pattern (M1-M10) on the surface of the upper housing (30), known as the recess distribution pattern (M1-M10). The invention also relates to a wiper blade comprising a mount (10) and a wiping system comprising such a wiper.

9 Claims, 8 Drawing Sheets (56) References Cited

FOREIGN PATENT DOCUMENTS

FR 2963595 A1 2/2012
WO WO-2007142390 A1 * 12/2007 ................ B60S 1/40

* cited by examiner

SUPPORT MOUNT FOR A WIPER BLADE, ASSOCIATED WIPER BLADE AND WIPING SYSTEM

The invention concerns a support mount for a wiper blade. The invention also concerns a wiper blade including a mount of that kind and a wiper system including a wiper of that kind.

The field of the present invention is that of equipment for vehicles and more particularly that of equipment for wiping windows of automobiles.

Automobiles are routinely equipped with wiper systems for washing the windshield and preventing the driver's view of their environment from being disturbed. These wipers are classically driven by arms or wiper-holders effecting an angular to-and-fro movement and including elongate blades themselves carrying wiper rubbers made of an elastic material. These rubbers rub against the windshield and evacuate water from the field of view of the driver. The wipers take the form either, in a classic version, of articulated swing-arms that hold the wiper rubber at a number of discrete locations or, in a more recent flat blade version, a semi-rigid assembly that holds the wiper rubber over all its length.

The patent application FR2963595A1 discloses a wiper blade including a support mount having a longitudinal main orientation and a wiper rubber that is carried by said mount. The mount includes a tubular upper body containing a bending spine and a lower housing that is open and contains an upper mounting stub of the wiper rubber. An aerodynamic deflector is fixed to said support mount by clipping it into lateral grooves provided on the support mount.

The upper tubular body, or upper housing, may be closed, as in the patent application FR2963595A1. It is also known for it to be substantially open in said longitudinal direction. This enables the flexibility of the support mount to be increased. However, in the event of extreme climatic conditions, for example very low temperatures, the opening formed on the upper housing of the support mount is not sufficient to impart the required flexibility to said support mount.

An object of the invention is to propose a support mount for a wiper blade the flexibility of which is reinforced whatever the climatic environment of the wiper blade.

Thus the invention concerns a support mount for a wiper blade, the mount comprising a body having a longitudinal extension main direction termed the main direction, the body comprising a first means intended to receive a bending spine and second means defining an open lower housing to receive an upper mounting stub of a wiper rubber of the wiper.

According to the invention, the first means defines an upper housing designed to cover the spine along the main direction and the upper housing includes a plurality of recesses facilitating the bending of the mount, the recesses forming a pattern on the surface of the upper housing, termed the recess distribution pattern defined by the distribution and/or the orientation of the recesses (32, 32', 32"). By the distribution of the recesses is meant in particular their distribution along the main direction. By the orientation of the recesses is meant their orientation relative to the main direction.

The support mount of the invention includes an upper housing of closed type. These mounts are particularly rigid.

The plurality of recesses in the surface of the upper housing enables reinforced flexibility to be imparted to the mount. Moreover, the plurality of recesses forms a recess distribution pattern that will be adapted to the required distribution of stresses along the longitudinal extension main direction of the mount.

The flexibility of the support mount of the invention is therefore reinforced whatever the climatic environment of the wiper blade.

According to various embodiments of the invention, separately or in combination:
- the recesses are separated by a substantially constant pitch along the main direction,
- the recesses are separated with a pitch that varies along the main direction,
- the recess distribution pattern comprises a plurality of recesses oriented substantially perpendicularly to the main direction,
- the recess distribution pattern further comprises a plurality of recesses oriented substantially parallel to the main direction,
- the recess distribution pattern comprises a plurality of recesses oriented relative to the main direction in at least one direction intersecting the main direction,
- the recess distribution pattern comprises a plurality of recesses tracing out a curve, the curve extending substantially transversely to the main direction,
- the lower housing also includes recesses,
- the recesses pass through the upper housing, and even the lower housing, within thickness thereof,
- the second means are longitudinal hooks,
- the hooks extend from a base of said housing,
- the upper housing is situated opposite the lower housing,
- the mounting of the upper stub of the wiper rubber in the mount is easy and intuitive,
- the mount is made of plastic material,
- the mount is made of polypropylene (PP),
- the upper housing, in particular the spine, is adapted to receive a heating element,
- the heating element extends along the main direction.

The invention also concerns a wiper blade including a mount as described above.

The invention also concerns a wiper system including at least one wiper of that kind.

The invention will be better understood and other objects, details, features and advantages thereof will become more clearly apparent in the course of the following detailed explanatory description of at least one embodiment of the invention given by way of purely illustrative and nonlimiting example with reference to the appended diagrammatic drawings:

The invention concerns a support mount 10 for a wiper blade as shown in the various figures. The mount 10 of the invention includes a body having a main longitudinal extension direction, termed the main direction and identified by the direction X in the figures. The main direction X of the support mount 10 is also that of the wiper blade. The body of the mount 10 includes a first means intended to receive a bending spine.

The spine is not shown here but the invention concerns any type of spine known to the person skilled in the art.

Figure 15:
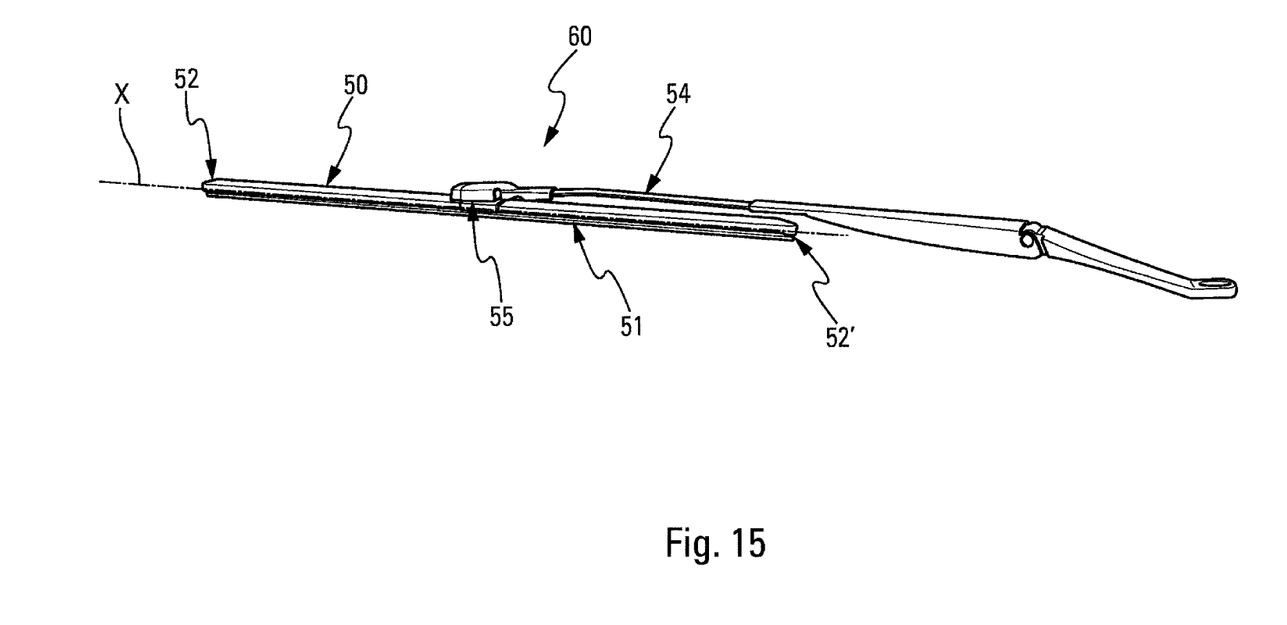
FIG. 15 shows an example of a wiper system including a wiper fitted with a mount according to the invention.

One example of a blade 50 is shown in FIG. 15 with one example of the wiper system 60 into which said blade 50 is integrated.

The body of the mount 10 also includes second means defining an open lower housing 20 to receive an upper mounting stub of a wiper rubber of the blade.

It is interesting to note that the bending spine imparts the necessary rigidity to press the wiper blade 50 onto the vehicle windshield and retains the wiper rubber 51 over all its length (see also FIG. 15).

The first means defines an upper housing 30 designed to cover the spine along the main direction X. In other words, this is a closed upper housing 24 intended to contain the bending spine.

For their part, the second means define the open lower housing 20 to receive the upper mounting stub of a wiper rubber 51 of the blade 50. An example of a wiper rubber 51 is shown here, in particular in FIG. 15.

The invention concerns any wiper rubber known to the person skilled in the art.

Said second means are longitudinal hooks 21, 22 extending here from a base 31 of the upper housing 30.

Although the support mount 10 is provided in order to impart stiffness to the wiper blade, said mount 10 is also advantageously flexible. Actually, there is also provision for adapting the pressing down of the blade as a function of the windshield to be wiped.

The support mounts 10 of the prior art do not have satisfactory flexibility in all circumstances. This is why, according to the invention, the upper housing 30 includes a plurality of recesses 32 facilitating the bending of the mount 10, the recesses 32 forming a pattern M1-M10 on the surface 33 of the upper housing 30, termed the recess distribution patterns M1-M10.

In other words, the recesses trace out a pattern M1-M10 on the upper housing 30, that pattern M1-M10 being particularly visible to an observer looking at a support mount 10 produced in accordance with the invention from above.

Again in other words, the recesses 32 are visible to the naked eye of an external user and their regular or irregular distribution forms a geometrical signature of the support mount 10. By "geometrical signature" is meant a set of straight and/or curved geometrical shapes which together form the visual identity of the support mount 10. This geometrical signature is particularly visible on the surface 33 of the upper housing 30.

Said pattern M1-M10 is advantageously defined by the distribution of the recesses 32 along the main direction X and/or by the orientation of the recesses 32, 32', 32" relative to the main direction X.

It can also be seen in all the figures that the lower housing 20 is situated opposite the upper housing 30 relative to the base 31 of the upper housing 30.

Figure 1:
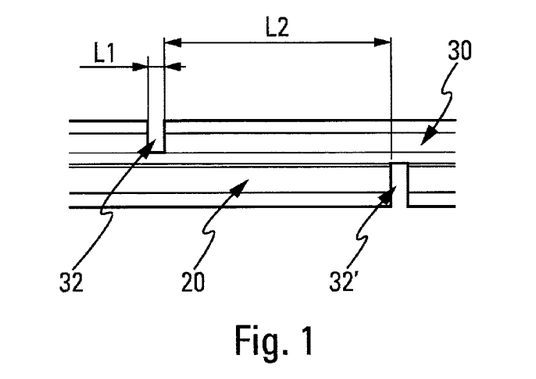
FIG. 1 is a diagrammatic representation of one embodiment of a mount according to the invention, seen from the side, with two recesses the dimensions of which are marked, FIG. 2 corresponds to the same representation as FIG. 1, as seen from above.
Figure 2:
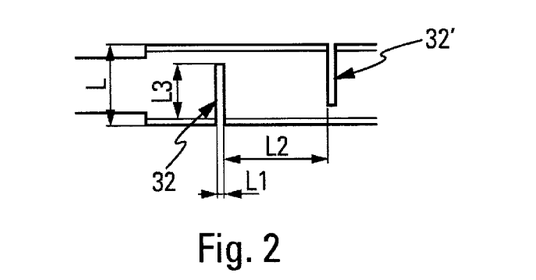
Figure 3:
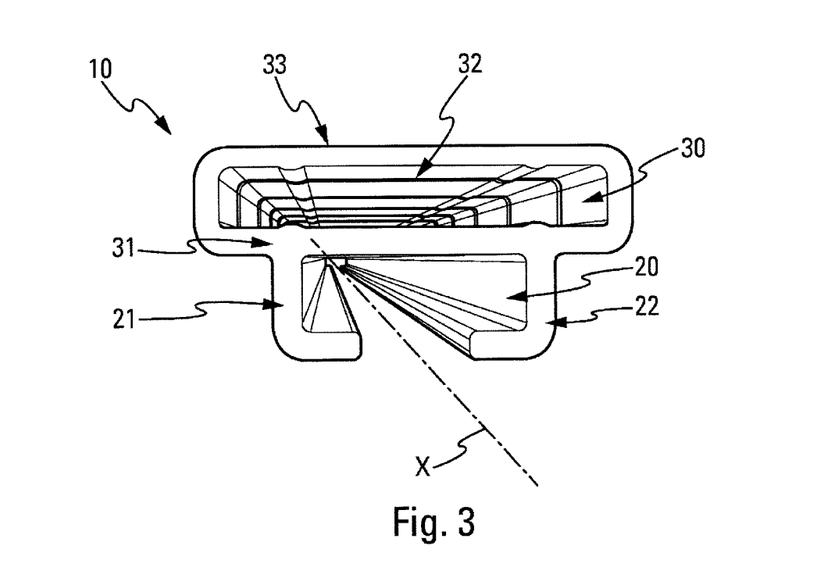
FIG. 3 is a slightly inclined isometric cavalier perspective view of one example of a mount according to the invention, as seen from the front.

There is particularly seen in FIGS. 1 and 2 an embodiment with two recesses 32, 32' taking the form of slots of width L1, length L3 and separated from one another by a distance L2.

In other words, L1 represents the sectional width of a recess 32, 32'; it may vary from a few tenths of a millimeter to a few millimeters. L2 represents the pitch, varying from 5 to 50 mm.

The pitch between the recesses 32 distributed along the main direction X may vary and may be irregular. This pitch L2 may be 5 mm at the center 41 of the mount and increase to 50 mm toward the end 42 of the mount (see FIG. 6).

In other words, a plurality of zones could be defined along the main direction X:
- a first zone close to the distal ends of the blade 50, in the vicinity of what the person skilled in the art calls protective end pieces, shown diagrammatically in FIG. 15 and indicated by the references 52, 52' in that said figure;
- a second zone close to the location intended to provide the connection between the blade 50 and a wiper arm 54 via a connector 55; and
- a third zone between said first and second zones.

The first zone could include recesses 32 very close together or the pitch between which is very small, like that shown in FIG. 14 (which example is described in more detail hereinafter). The second zone, corresponding to the center 41 of the mount, could comprise only a few recesses 32 or none at all. For its part the third zone could include recesses 32 with the pitches between them varying from one pattern M1-M10 to another.

L3 is the sectional length; it represents a percentage of the width L of the surface 33 of the upper housing 30. The value L3 varies from 5 to 100% of the width L of the surface 33 of the upper housing 30.

It is interesting to note that each parameter described above: L1, L2, L3, directly impacts the flexibility of the support mount 10 of the invention. Varying those parameters L1, L2 and L3, separately or in combination, enables this flexibility to be varied according to what is required.

The recesses 32, or cut-outs, could assume different shapes, as well as variable orientations, positions and pitches.

Figure 4:
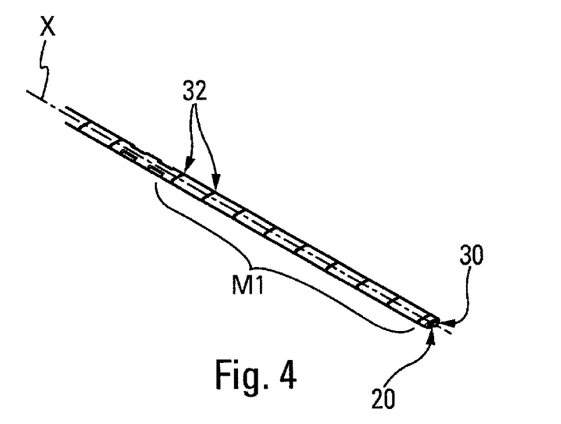
FIGS. 4 to 12 are slightly inclined isometric views showing various recess distribution patterns on the surfaces of the upper housing of various examples of mounts according to the invention.

In the example shown in FIG. 4 the distribution pattern M1 of the recesses 32 comprises a plurality of recesses 32 oriented substantially perpendicularly to the main direction and regularly spaced from one another.

Figure 5:
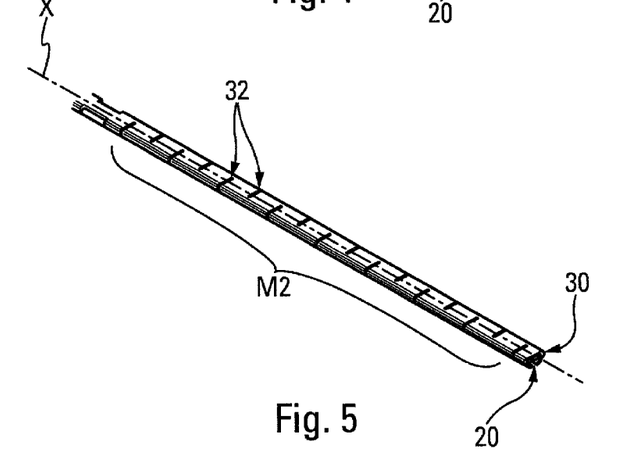

In the example shown in FIG. 5 the distribution pattern M2 of the recesses 32 includes a plurality of recesses 32 oriented substantially perpendicularly to the main direction and regularly spaced from one another. On the other hand, they are distributed in quincunxes along the main direction X, in particular with the aim of obtaining greater flexibility of the support mount 10 without reducing its rubber retention function.

Figure 6:
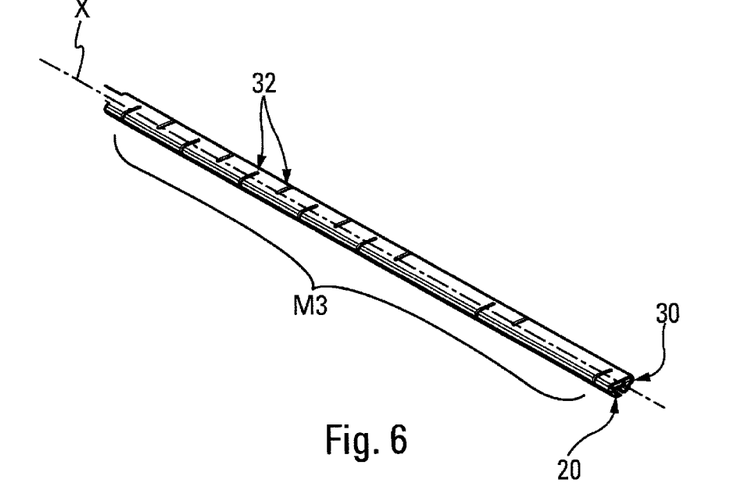

The example shown in FIG. 6 is close to that shown in FIG. 5. On the other hand, the pattern M3 comprises recesses 32 with a pitch that varies between two consecutive recesses 32. This varying pitch enables adaptation of the distribution of the stresses required on a vehicle windshield to be wiped.

Figure 7:
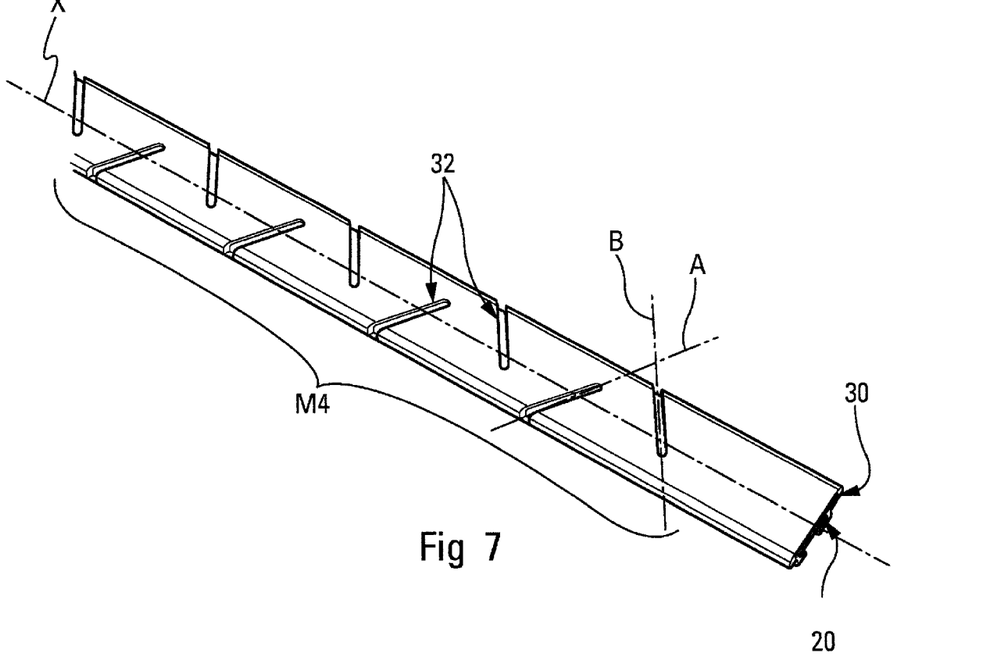

The example shown in FIG. 7 comprises recesses 32 oriented relative to the main direction X in at least one direction intersecting the main direction X, here two directions A, B that intersect the main direction X. The pattern M4 formed in this way resembles offset chevrons.

Figure 8:
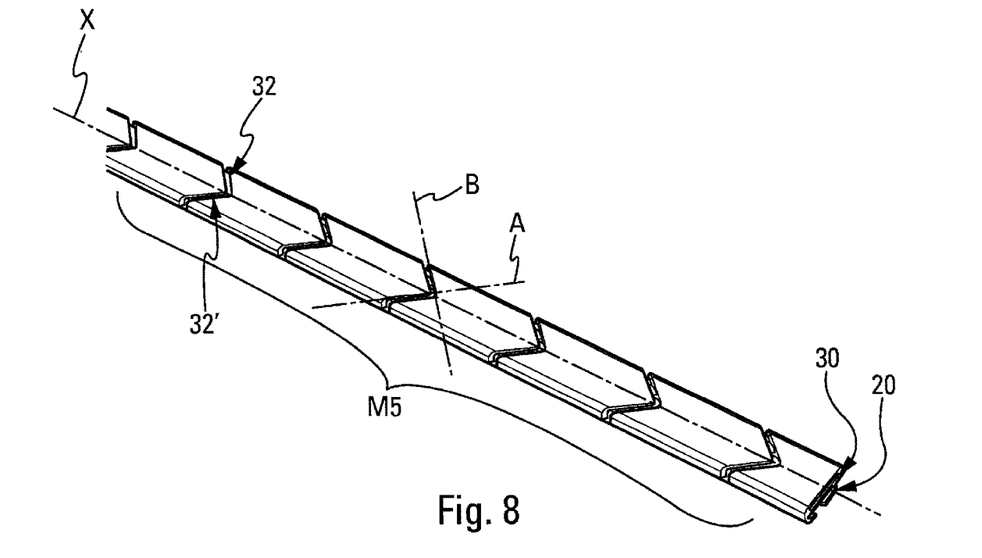

The example shown in FIG. 8 is close to that shown in FIG. 7. On the other hand the pattern M5 resembles chevrons forming an arrowhead, in particular through pairs of recesses 32, 32' that join at the level of the main direction X.

It is interesting to note that the pitch between two chevrons of the patterns M4 and M5 may be fixed but may also be variable. It is also interesting to note that the chevrons may all be oriented in the same direction to facilitate sliding of the spine inside the upper housing 30 during the assembly phase.

Figure 9:
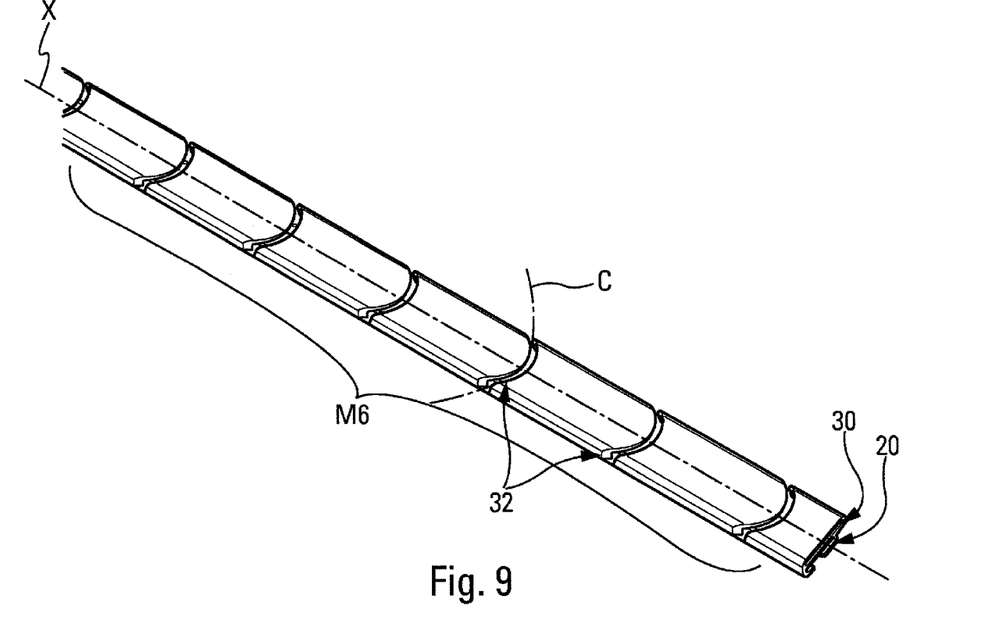

In the example shown in FIG. 9 the distribution pattern M6 of the recesses 32 comprises a plurality of recesses 32 tracing out a curve C, the curve C extending substantially transversely to the main direction X.

Figure 10:
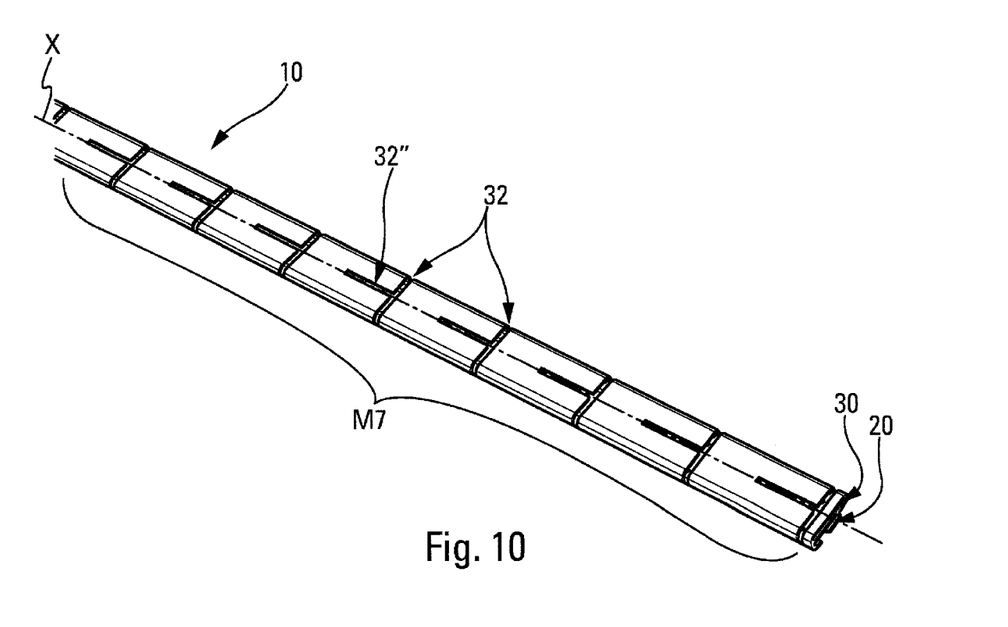

In the example shown in FIG. 10 the distribution pattern M7 of the recesses 32, 32" further comprises a plurality of recesses 32" oriented substantially parallel to the main direction X so as to trace out "T" shapes when these recesses 32" are combined with recesses 32 that extend substantially perpendicularly to the main direction X. It is also interesting to note that the "T" shapes may all be oriented in the same direction to facilitate sliding of the spine inside the upper housing 30 during the assembly phase. The flexibility of the mount 10 with this distribution pattern M7 is then optimized.

Figure 11:
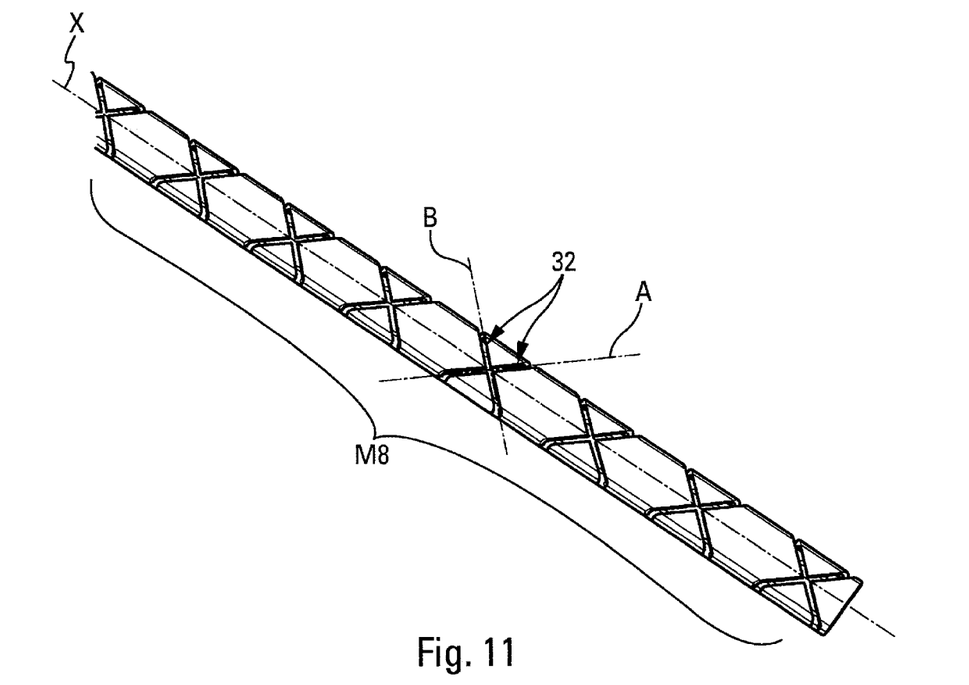
Figure 12:
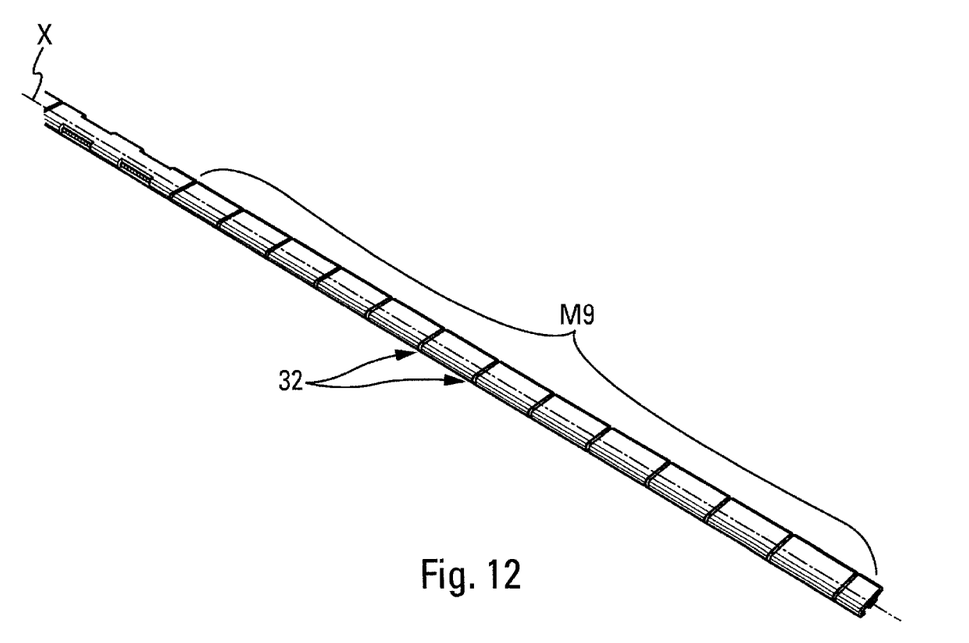

In the example shown in FIG. 11 the distribution pattern M8 comprises recesses 32 oriented relative to the main direction X in two directions A, B that intersect the main direction X so as to trace out "X" shapes when these recesses 32 are combined with one another. It is interesting to note that a short pitch between the "X" shapes will enable further optimization of the flexibility imparted to the mount 10 by this pattern example M8.

In the examples described above—patterns M1 to M8—the longitudinal flexibility is controlled progressively so as to increase the curvature of the support mount 10 during mounting on a stationary vehicle to prevent the latency effect caused by the stiffness of the plastic materials used or even to balance the stiffness caused by cold/winter temperature conditions. This remark is also valid during dynamic operation. Actually, the support mount 10 will preferably be produced in a plastic material, although any other material is possible, for example a metal. In the present instance, the recesses 32 could be easily provided during the production of said mount 10 in a plastic material of polypropylene (PP) type.

In all of the instances described above, the parameters L1, L2, L3 may separately or in combination intervene in and impact on the characteristic flexibility curve of the support mount 10.

Figure 13A:
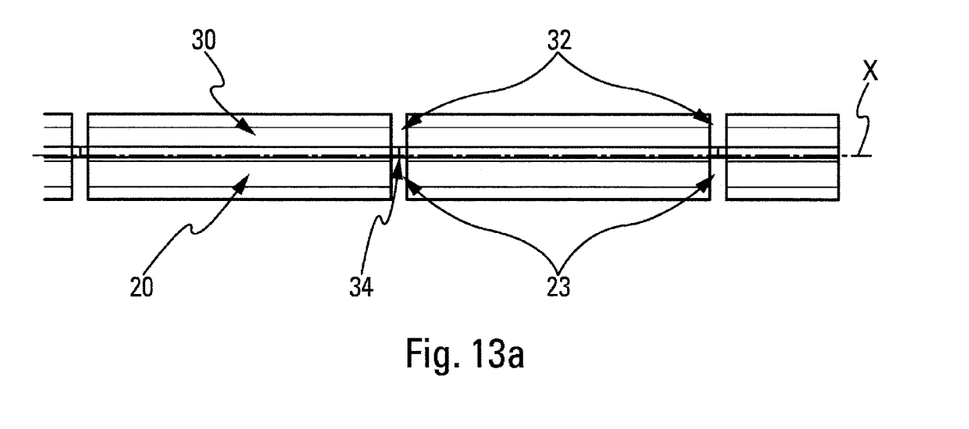
FIGS. 13a, 13b and 13c are diagrammatic representations of the embodiment of the mount shown in FIG. 12, as seen from the side, from above and from below.
Figure 13B:
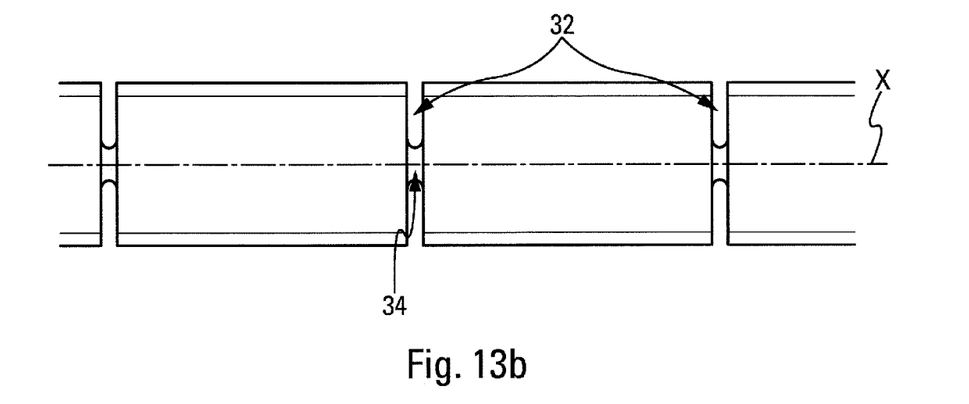
Figure 13C:
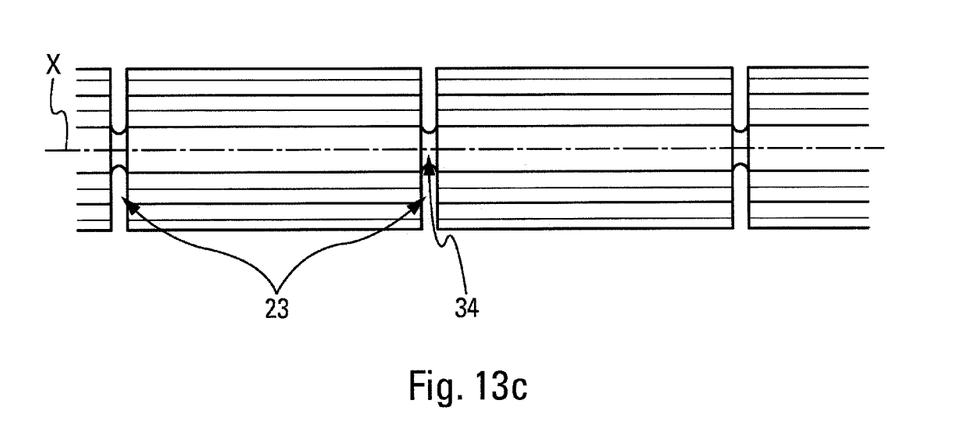

The lower housing 20 could advantageously also include recesses 23 (see FIGS. 12 and 13a, 13b and 13c). In the embodiment shown in those figures, the support mount 10 is recessed at the level of the lower housing with recesses 23 and at the level of the upper housing 30 with recesses 32 so as to form the pattern marked M9 in FIG. 12. Thus the support mount 10 is held by a bridge 34 of material visible in the views from the side (FIG. 13a), from above (FIG. 13b) and from below (FIG. 13c). This bridge 34 of material serves as a binder between the parts with no recesses 32, 23. In other words, the bridge 34 of material is a continuous longitudinal portion of the base 31. This bridge 34 of material enables a maximum flexibility to be obtained whilst maintaining sufficient retention and guidance of the spine and of the stub of the wiper rubber. The pattern M9 enables the most transparent possible mount 10 to be obtained in the operation of the blade 50 provided therewith in terms of static and dynamic curvature.

It is interesting to note that all of the examples described above could be combined without departing from the scope of the invention, in particular with the aim of obtaining advantageous technical effects.

Figure 14:
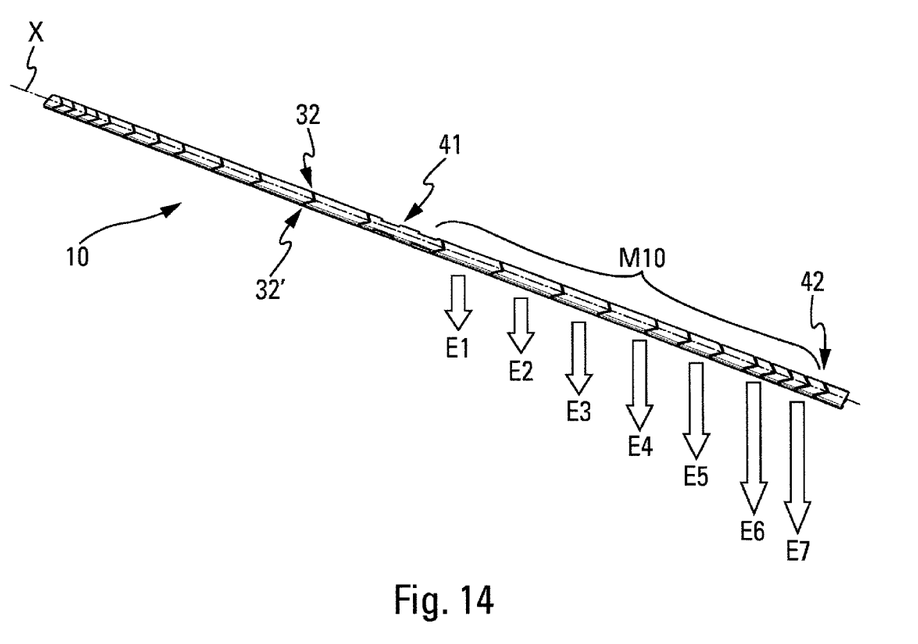
FIG. 14 shows one embodiment of a mount having a given recess distribution pattern and a diagram of the stresses along the main direction of that mount.

The example shown in FIG. 14 is a combination of the patterns as described above. In this example, the pattern M10 includes recesses in the form of chevrons with a varying pitch along the main direction X between them. The stresses or forces E1-E7 applied by the mount 10 of the invention to the windshield of a vehicle with which it is intended to cooperate differ along the main direction X. Here these forces E1-E7 are higher as the pitch decreases from the center 41 of the mount 10 toward the end 42 thereof.

Thus the chosen pattern M1-M10 induces a mechanical behavior in deformation according to the various sections of the support mount 10 along the main direction X. By "sections" is meant the zones of the mount 10 that are located between two consecutive recesses 32 along the main direction X.

It is also interesting to note that the recesses 32, 32', 32", 23 will preferably pass through the upper housing 30 and even the lower housing 20, within their thickness, thus forming openings through the material of those housings 20, 30.

It is to be noted that variant embodiments are of course possible. In particular it is also possible, in a supplementary embodiment, for the upper housing 30, in particular above said spine, to be adapted to receive a heating element (embodiment not shown). In this embodiment, the heating element extends along the main direction X.

Regardless of the embodiment, the invention that has just been described will find a preferred application in wiper blades 50 of wiper systems 60 for motor vehicles.

The invention claimed is:

1. A support mount for a wiper blade, the mount comprising:
   a body having a longitudinal extension main direction termed the main direction, the body comprising a first means that receives a bending spine and second means defining an open lower housing to receive an upper mounting stub of a wiper rubber of the wiper,
   wherein the first means defines an upper housing that covers the spine along the main direction,
   wherein the upper housing includes a plurality of recesses facilitating the bending of the mount, the plurality of recesses forming a pattern on the surface of the upper housing, termed the recess distribution pattern, defined by the distribution and/or the orientation of the plurality of recesses, and
   wherein the plurality of recesses are separated with a pitch that varies along the main direction.

2. The mount as claimed in claim 1, in which the recess distribution pattern comprises the plurality of recesses oriented substantially perpendicularly to the main direction.

3. The mount as claimed in claim 2, in which the recess distribution pattern further comprises a plurality of recesses oriented substantially parallel to the main direction.

4. The mount as claimed in claim 1, in which the recess distribution pattern comprises the plurality of recesses oriented relative to the main direction in at least one direction intersecting the main direction.

5. The mount as claimed in claim 1, in which the recess distribution pattern comprises the plurality of recesses chasing out a curve, the curve extending substantially transversely to the main direction.

6. The mount as claimed in claim 1, in which the lower housing also includes recesses.

7. A wiper blade comprising a mount as claimed in claim 1.

8. A wiper system comprising at least one blade as claimed in claim 7.

9. A support mount for a wiper blade, the mount comprising:
- a body having a longitudinal extension main direction termed the main direction, the body comprising a first means that receives a bending spine and second means defining an open lower housing to receive an upper mounting stub of a wiper rubber of the wiper,
- wherein the first means defines an upper housing that covers the spine along the main direction,
- wherein the upper housing includes a plurality of recesses facilitating the bending of the mount, the plurality of recesses forming a pattern on the surface of the upper housing, termed the recess distribution pattern, defined by the distribution and/or the orientation of the plurality of recesses, and
- the recess distribution pattern comprises the plurality of recesses chasing out a curve, the curve extending substantially transversely to the main direction.

* * * * *